(12) United States Patent          (10) Patent No.:     US 7,729,450 B2
     Thor et al.                    (45) Date of Patent:        Jun. 1, 2010

(54) SPREAD SPECTRUM SIGNAL RECEIVER

(75) Inventors: Jonas Paul Thor, Lulea (SE);
                Per-Ludvig Normark, Stockholm (SE)

(73) Assignee: Nordnav Technologies AB, Lulea (SE)

( * ) Notice: Subject to any disclaimer, the term of this patent is extended or adjusted under 35 U.S.C. 154(b) by 1030 days.

(21) Appl. No.: 11/288,638

(22) Filed: Nov. 28, 2005

(65) Prior Publication Data

US 2007/0121707 A1    May 31, 2007

(51) Int. Cl.
     *H04L 27/00* (2006.01)
(52) U.S. Cl. .......... 375/316; 375/130; 375/150; 375/140; 375/131; 455/130; 455/12.1; 455/13.2; 370/69.1; 370/319; 370/320; 370/321; 370/330; 370/335; 370/342; 370/345; 370/347; 333/193; 333/194; 333/195; 333/196; 342/150; 342/151; 342/152; 342/153; 342/155; 342/156; 342/357
(58) Field of Classification Search .......... 375/150, 375/316, 130, 140, 147, 131; 370/319, 320, 370/321, 330, 335, 342, 345, 347; 342/150, 342/151, 152, 153, 154, 155, 156, 357; 333/193, 333/194, 195, 196; 455/12.1, 13.2
See application file for complete search history.

(56) References Cited

U.S. PATENT DOCUMENTS

| 4,785,463   | A  | * | 11/1988 | Janc et al. .......... 375/147 |
| 6,118,808   | A  | * | 9/2000  | Tiemann et al. ...... 375/142 |
| 7,430,258   | B2 | * | 9/2008  | Thomas, Jr. ......... 375/347 |
| 2004/0156449| A1 | * | 8/2004  | Bose et al. .......... 375/316 |

* cited by examiner

*Primary Examiner*—Shuwang Liu
*Assistant Examiner*—Helene Tayong
(74) *Attorney, Agent, or Firm*—Ronald L. Yin; DLA Piper LLP US

(57) ABSTRACT

A proposed spread spectrum signal receiver includes a radio front-end unit and a processing unit. The radio front-end unit, in turn, has an antenna, a digitizing circuit and a primary buffer unit. The antenna is adapted to receive radio signals ($S_{HF}$) from a plurality of signal sources, and the digitizing circuit is adapted to downconvert and filter the received signals ($S_{HF}$), and generate sample values ($S_{BP-D}$) thereof. The primary buffer unit is adapted to temporarily store the sample values ($S_{BP-D}$) from the digitizing circuit and allow the processing unit to read out a first set of stored sample values ($S_{BP-D}$) contemporaneously with the storing of a second set of sample values ($S_{BP-D}$) in the primary buffer unit. The processing unit is adapted to receive the sample values ($S_{BP-D}$) from the primary buffer unit, and based thereon, produce position/time related data ($D_{PT}$).

14 Claims, 2 Drawing Sheets

SPREAD SPECTRUM SIGNAL RECEIVER

TECHNICAL FIELD

The present invention relates generally to reception and processing of spread spectrum signals. More particularly the invention relates to a spread spectrum signal receiver having an improved front end unit with a buffer.

THE BACKGROUND OF THE INVENTION AND PRIOR ART

Spread spectrum transmission solutions are becoming increasingly important, for instance in global navigation satellite systems (GNSS). Presently, the Global Positioning System (GPS; U.S. Government) is the dominating standard, however alternative standards exist and are expected to gain increased importance in the future. So far, the Galileo system (the European programme for global navigation services), the Quasi-Zenith Satellite System (QZSS; Advanced Space Business Corporation in Japan) and the Global Orbiting Navigation Satellite System (GLONASS; Russian Federation Ministry of Defense) constitute the major alternative standards. Moreover, various types of mobile telecommunications systems employ spread spectrum transmission formats, such as the second generation standard IS-95 and the third generation standards IMT-2000 and CDMA2000.

In any case, due to the dissimilarities in the signal formats and the frequency bands specified by the different standards, a signal receiver adapted for one standard is generally not able to receive and process signals from signal sources belonging to a system that operates according to another standard.

Thus, multiple receiver chains are required to enable reception of signals from more than one type of system. However, including more than one receiver chain in a single device renders the device expensive, bulky and heavy. Therefore, a programmable software receiver solution is desired, which enables processing of many signal formats in one and the same processor, e.g. a CPU (central processing unit) or a DSP (digital signal processor). In such a design, it is possible to alter the signal processing principles depending on which signals are received and processed. A software-based receiver is also advantageous in that this kind of receiver may co-exist efficiently with other types of signal receivers, signal processing devices and/or software applications, for example in a laptop computer, a mobile telephone or a PDA (Personal Digital Assistant).

However, the software-receiver approach presents a number of new problems. In a hardware receiver design, the signal processor has a highly standardized and well-defined interface to the radio front-end. A multi-purpose software signal processor, on the other hand, must have a comparatively open and flexible interface towards the radio front-end and be capable of handling many different types of incoming source data having characteristics, which vary over relatively wide ranges in terms of frequency bands, bandwidth, modulating principle, signal formats and signal power levels.

Various types of buffering solutions are known in the art, which allow signal samples to be stored temporarily before being further processed. For example, the published US patent application 2005/0001764 describes a flexible architecture GPS receiver having a buffer for capturing incoming radio frequency signals at a rate consistent with the GPS bandwidth. The buffer allows repeated "playbacks" of the buffered data at rate consistent with the processing hardware. Thereby, a simultaneous search and tracking of GPS signals can be performed. It is also possible to emulate a multi-channel receiver based on a single channel receiver hardware.

The published European patent application 1 467 221 discloses a GPS receiver with signal memories and parallel correlators, wherein an intermediate frequency signal is sampled and stored in a memory. The memory, in turn, has two memory banks which alternately receive samples. Thus, during a write period in one of the memory banks, the other bank may supply its output to a processor. It is stated that this design is useful when the incoming signal contains several satellite transmissions. Nevertheless, here, the subsequent processing is performed entirely in hardware, and the received satellite signals all have the same format.

The published international patent application WO 03/065610 describes a pilot searcher for GPS and CDMA signals, wherein a sample buffer is used to enable a real-time mode as well as an off-line mode operation. In the real-time mode, the sample buffer is used as a circular buffer whereby samples are written to the buffer in real time as they are received, and are thereafter retrieved, as they are needed for processing. Hence, pilots may be searched in real time in the received signal. In the off-line mode, the sample buffer is used to store a particular time window of samples, and the stored samples may then be retrieved one or more times as required for processing. Moreover, the samples may be decimated and packed prior to storing in the sample buffer, such that each packed sample represents a data word including a particular I/Q-pair of samples.

However, all the known sample-buffer based receivers include hardware, which is designated to process signals with very specific characteristics. Therefore, none of these solutions allows the kind of parameter flexibility required by a software-implemented receiver.

SUMMARY OF THE INVENTION

The object of the present invention is therefore to alleviate the above problems and provide a highly flexible software-based solution for receiving and processing spread spectrum signals.

According to the invention, the object is achieved by the receiver as initially described, wherein the radio front-end unit includes a primary buffer unit. This unit, in turn, is adapted to store the sample values from the digitizing circuit, and allow the processing unit to read out a first set of stored sample values contemporaneously with the storing of a second set of sample values in the primary buffer unit.

This receiver design is advantageous because the primary buffer unit renders it possible to transfer data to the processing unit in a highly efficient manner (e.g. based on interrupts) irrespective of the signal format used.

According to one preferred embodiment of the invention, the digitizing circuit and the primary buffer unit are integrated onto one and the same integrated circuit. Thus, the manufacturing costs can be made relatively low.

According to another preferred embodiment of the invention, the digitizing circuit includes at least two separate signal processing modules, which each is adapted to downconvert, filter and sample incoming signals of a respective format. The incoming signal may, or may not, occupy the same range of the radio spectrum. Thereby, multiple types of spread spectrum signals can be processed to form the basis for the derived position/time related data. Naturally, this design is desirable from a flexibility and quality point-of-view.

According to yet another preferred embodiment of the invention, the integrated circuit includes a bit-packing module, which is adapted to alter a relative order of at least two sample values from the digitizing circuit before these sample values are stored in the primary buffer unit. This strategy is advantageous in that it allows baseband processing improvements.

According to still another preferred embodiment of the invention, the radio front-end unit has a data interface towards the processing unit. This interface is adapted to a data format of the processing unit's input interface. Hence, the processing unit may conveniently retrieve the sample values from the radio front-end unit. The data interface and the input interface may either be of parallel- or serial-bus type. However, a parallel interface is more preferable, since this type of interface is generally less resource demanding for the processing unit.

According to a further preferred embodiment of the invention, the radio front-end unit includes a first oscillator module adapted to deliver a first clock signal to the digitizing circuit. The processing unit is associated with a second oscillator module, which is adapted to deliver a second clock signal to the processing unit. Since radio front-end unit and the processing unit thus represent separate clock domains, the interfaces are adapted to operate according to an asynchronous protocol. This may be advantageous in some applications.

However, according another preferred embodiment of the invention, the radio front-end unit includes a first oscillator module, which is adapted to deliver a first clock signal to the digitizing circuit. Here, the processing unit does not provide clock for the interfaces. Therefore, these interfaces are adapted to operate according to a synchronous protocol based on the first clock signal, i.e. the first clock signal is transferred via the interface to the processing unit. Alternatively, the processing unit may be associated with a second oscillator module, which is adapted to deliver a second clock signal to the processing unit. In this embodiment of the invention, the interface are adapted to operate according to a synchronous protocol based on the second clock signal, i.e. the second clock signal is instead transferred via the interface to the radio front-end unit.

According to yet another preferred embodiment of the invention, the signal processing unit includes software that implements at least one radio signal processing function, which in turn, is adapted to produce the position/time related data. As mentioned initially, such a design provides a large degree of freedom in terms of the signal processing principles. The implementation can also co-exist efficiently with other types of processors and software applications.

According to still another preferred embodiment of the invention, the processing unit includes a secondary buffer unit adapted to temporarily store the sample values before these are being processed by the software. Thereby, a transfer rate between the radio front-end unit and the processing unit can be made constant, and at the same time, the processing unit may vary its processing rate. This is a very important feature to attain high efficiency in a software implementation.

According to another preferred embodiment of the invention, the secondary buffer unit is adapted to allow data read-outs therefrom in an order being different from a first-in-first-out order (i.e. the processing unit is free to select the specific order in which the sample values are handled). More preferably, the secondary buffer unit has an interface towards the software, which is adapted to provide the processing unit with a direct-memory access to the sample values stored in the secondary buffer unit. Thereby, an interrupt may inform the processing unit when a new batch of samples is ready to be processed. This strategy is desirable because it requires a minimum of resources in the processing unit.

According to a further preferred embodiment of the invention, the secondary buffer unit includes a first storage area and a second storage area. These storage areas are adapted to enable read and write operations in such a manner that while data is written into one area of the areas read operations are enabled in respect of the other area. Thus, a contemporaneous storing and read-out of sample values is allowed.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
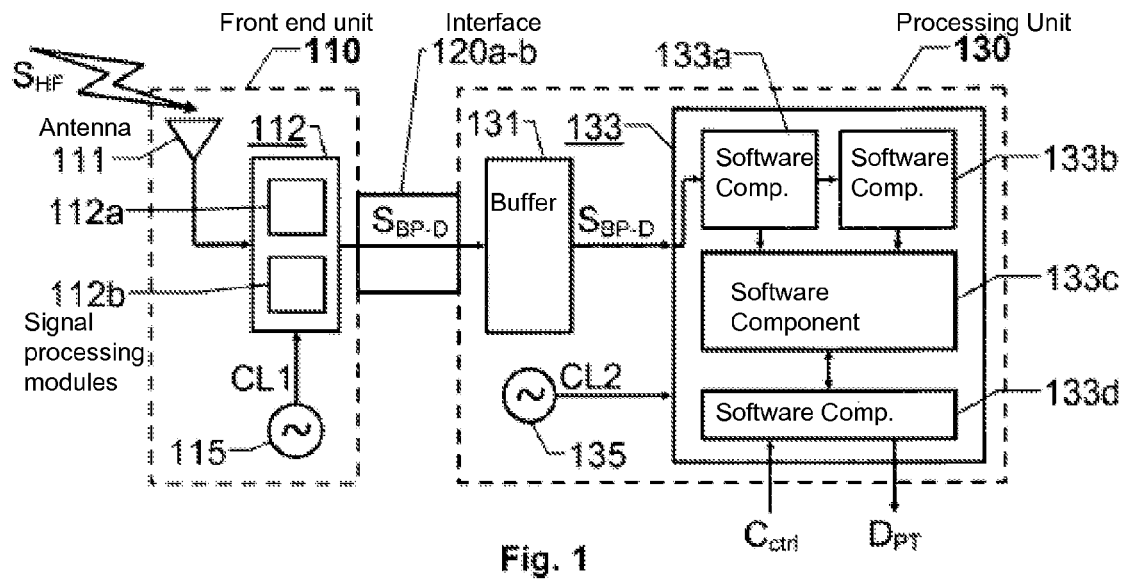
FIG. 1 shows a block diagram of a spread spectrum signal receiver according to one embodiment of the invention.
Figure 2:
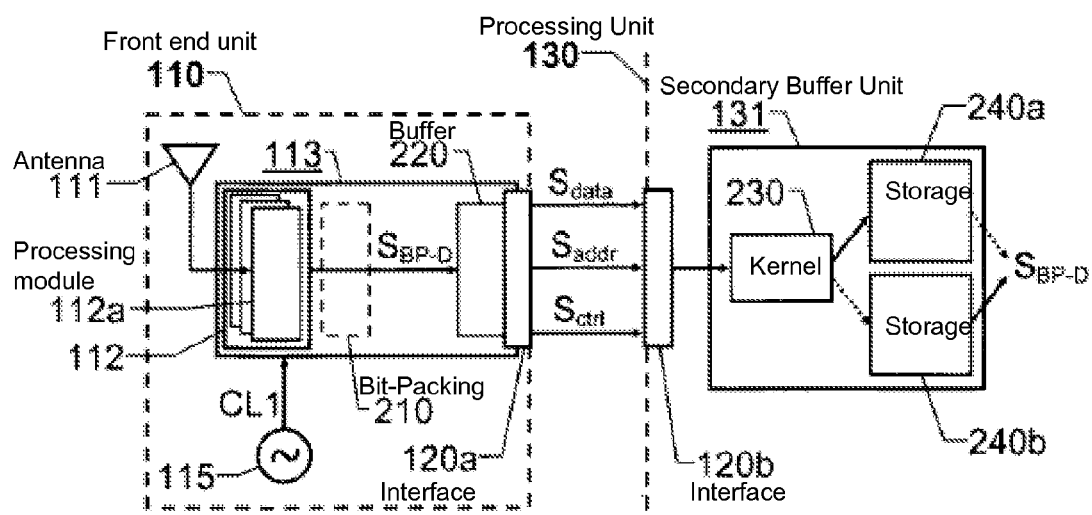
FIG. 2 shows a block diagram illustrating further details of a proposed interface between the radio front-end unit and the processing unit according to one embodiment of the invention.

FIG. 1 shows a block diagram of a spread spectrum signal receiver according to one embodiment of the invention. The receiver includes a radio front-end unit 110 and a processing unit 130. FIG. 2 illustrates further details of an interface 120a-b between the radio front-end unit 110 and the processing unit 130.

The radio front-end unit 110, in turn, has an antenna 111 adapted to receive radio signals $S_{HF}$ from a plurality of signal sources, e.g. a set of satellites in a GNSS. Thus, the antenna 111 is typically capable of receiving radio frequency signals of at least one of the L1-, L2- and L5-bands, i.e. frequencies within 1563-1587 MHz, 1215-1240 MHz and 1155-1197 MHz respectively.

The radio front-end unit 110 also includes a digitizing circuit 112 and a primary buffer unit 220. The digitizing circuit 112 is adapted to downconvert and filter the received signals $S_{HF}$, and generate sample values $S_{BP-D}$ thereof. The primary buffer unit 220 is adapted to temporarily store the sample values $S_{BP-D}$ from the digitizing circuit 112. Thus, the primary buffer unit 220 allows the processing unit 130 to read out a first set of stored sample values $S_{BP-D}$ contemporaneously with the storing of a second set of sample values $S_{BP-D}$ in the primary buffer unit 220. One example of a primary buffer 220 is a dual bank SRAM. Another example is a FIFO shift register. The primary buffer unit 220 may have a relatively small capacity, say in the order of 32-64 kbit. The processing unit 130 is adapted to receive the sample values $S_{BP-D}$, and based thereon, produce position/time related data $D_{PT}$, e.g. pertaining to geographical positions, time and/or velocity parameters.

Preferably, the digitizing circuit 112 includes at least two separate signal processing modules 112a and 112b respectively, which each is adapted to downconvert, filter and sample incoming signals $S_{HF}$ of a particular format. For instance, a first module 112a may be adapted to process GPS signals, whereas a second module 112b may be adapted to process Galileo signals, and so on. Provided that the antenna 111 is adapted to receive radio signals $S_{HF}$ within more than one frequency band, each specific module 112a, 112b etc. is preferably adapted to process incoming signals $S_{HF}$ within a respective range of the radio spectrum, e.g. one of the above-mentioned L1-, L2- and L5-bands. Typically, the digitizing circuit 112 includes bandpass filters having a bandwidth of 2-10 MHz, and the incoming signals $S_{HF}$ are downconverted to an intermediate frequency centered at a frequency within a range from 1 MHz to 10 MHz. Moreover, each of the generated sample values $S_{BP-D}$ is normally represented by 1 to 4 bits.

According to a further preferred embodiment of the invention the digitizing circuit 112 and the primary buffer unit 220 are integrated onto one and the same integrated circuit 113. Namely, this results in a cost-efficient design, and vouches for small power losses. Additionally, the integrated circuit 113 may include a bit-packing module 210, which is adapted to reorder the sample values $S_{BP-D}$ from the digitizing circuit 112 before the sample values $S_{BP-D}$ are stored in the primary buffer unit 220, i.e. the bit-packing module 210 alters the relative order of at least two sample values $S_{BP-D}$ according to a particular algorithm, for instance implying that a set of samples representing a particular phase angle are stored consecutively. Thereby, the efficiency of the subsequent baseband signal processing can be improved.

According to one preferred embodiment of the invention, the radio front-end unit 110 includes a data interface 120a towards the processing unit 130, which data interface 120a is adapted to a data format of an input interface 120b of the processing unit 130. Of course, this facilitates the processing unit's 130 access to the primary buffer unit 220.

At least one of the radio front-end unit 110 and the processing unit 130 must include an oscillator. In this example, the radio front-end unit 110 has a first oscillator module 115, which is adapted to deliver a first clock signal CL1 to the digitizing circuit 112, as well as any other units connected thereto, e.g. the bit-packing module 210 and the primary buffer unit 220. The processing unit 130 is associated with a second oscillator module 135, which is adapted to deliver a second clock signal CL2 to the processing unit 130, and any other units synchronized therewith. Each of the oscillator modules 115 and 135 preferably has a clock frequency of 5 MHz, or more. For instance, the clock driving the digitizing circuit 112 may lie in the range 5-40 MHz, or more preferably be within 5-16 MHz. Moreover, clock should have accuracy around 1 ppm (parts per million, i.e. 0.0001%). Instead of having a separate clock domain for each of the radio front-end unit 110 and the processing unit 130, these units may share a common clock source. However, this will be discussed below with reference to FIGS. 4 and 5.

In any case, the data interface 120a and the input interface 120b may be adapted to a parallel-bus format as well as a serial bus format. In case of a serial bus, the formats SDIO (Secure Digital Output Input) and MMC (MultiMedia Card) are appropriate. Specifically, the SDIO modes SPI (Serial Peripheral Interface) and SD1 may here be used. Nevertheless, a parallel format is generally preferable because in most cases such an interface is more efficient from a processing point-of-view. One example is the SDIO mode SD4, which is a 4-bit parallel format. The interfaces 120a-b preferably have an essentially constant data transfer rate in the range 5-50 Mbits/s.

According to one preferred embodiment of the invention, the signal processing unit 130 includes software 133 containing components adapted to implement at least one radio signal processing function for producing the position/time related data DPT.

Specifically, a first software component 133a may represent an acquisition engine adapted to search for and detect spread spectrum signals, a second software component 133b may represent a correlation engine adapted to correlate/track any acquired signals, at least one third software component 133c may represent tracking logic, acquisition logic, code loops and carrier tracking loops for one or more GNSSs (e.g. GPS, Galileo, QZSS and GLONASS) as well as various navigation filters (e.g. including least square solutions and/or Kalman filters), and a fourth software component 133d may represent an application program interface (API) towards other software co-existing with the proposed software 130 in the processing unit 130.

According to one preferred embodiment of the invention, the processing unit 130 also includes a secondary buffer unit 131. This unit 131 is adapted to temporarily store the sample values $S_{BP-D}$ before these are being processed by the software 133. It is further preferable if the secondary buffer unit 131 is adapted to allow data read-outs there from in an order being different from a first-in-first-out order. Thereby, the processing unit 130 is provided with an efficient access to the sample values $S_{BP-D}$, especially if the secondary buffer unit 131 has a DMA (direct memory access) interface towards the software 133.

The combined effect of the proposed primary buffer unit 220 and the secondary buffer unit 131 is that, from the processing unit's 130 point-of-view, the incoming data (i.e. the sample values $S_{BP-D}$) appear to originate from a conventional type of memory, such as an external RAM (Random Access Memory). This is a highly advantageous effect because thereby the required processing demand in the processing unit 130 to handle the data transfer, for instance expressed in terms of MIPS (Millions of Instructions Per Second), can be minimized. Preferably, a DMA kernel 230 in the unit 130 generates an interrupt (e.g. hardware-based) to a processing kernel in the unit 130 whenever a new batch of sample values $S_{BP-D}$ in the secondary buffer unit 131 is ready to be processed by the software 133.

According to a further preferred embodiment of the invention, the secondary buffer unit 131, in turn, includes a first storage area 240a and a second storage area 240b. These storage areas 240a and 240b respectively are arranged, so that write operations in respect of one area, say 240a, are enabled while enabling read operations in respect of the other area, say 240b. Consequently, a contemporaneous storage and read-out of sample values $S_{BP-D}$ is allowed. This further enhances the performance and the flexibility of the design.

Figure 3:
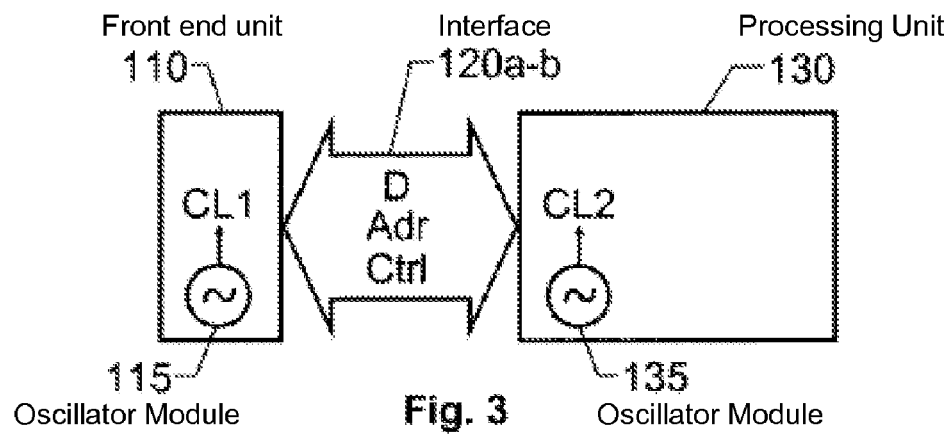
FIGS. 3-5 illustrate various interface types applicable between the radio front-end unit and the processing unit according to different embodiments of the invention.

FIG. 3 shows a block diagram, which schematically represents the above-described asynchronous interface 120a-b between the radio front-end unit 110 and the processing unit 130. Here, the radio front-end unit 110 includes a first oscillator module 115 adapted to deliver a first clock signal CL1, i.a. to the digitizing circuit 112. The processing unit 130, however, is associated with a second oscillator module 135, which is adapted to deliver a second clock signal CL2.

Figure 4:
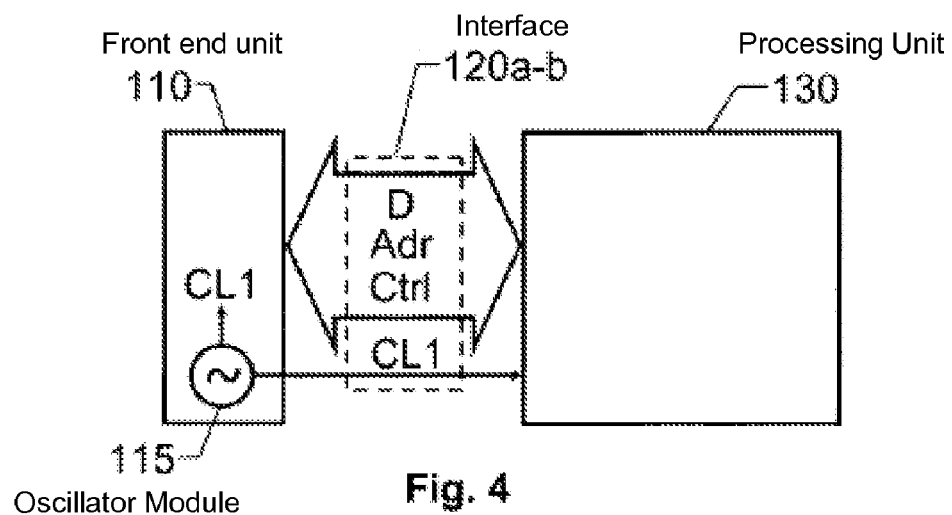

FIG. 4 shows a block diagram, which instead illustrates a synchronous interface 120a-b between the radio front-end unit 110 and the processing unit 130 according to another preferred embodiment of the invention. Also in this case, the radio front-end unit 110 includes a first oscillator module 115, which is adapted to deliver a first clock signal CL1 to, among others, the digitizing circuit 112. The processing unit 130 has no clock resource for the interface 120a-b. Therefore, the interface 120a-b is adapted to operate according to a synchronous protocol based on the first clock signal CL1. I.e. the interface 120a-b includes the first clock signal CL1, such that this signal can be used i.a. by the processing unit 130. Here, the interface 120*a-b* is preferably of SPI type.

Figure 5:
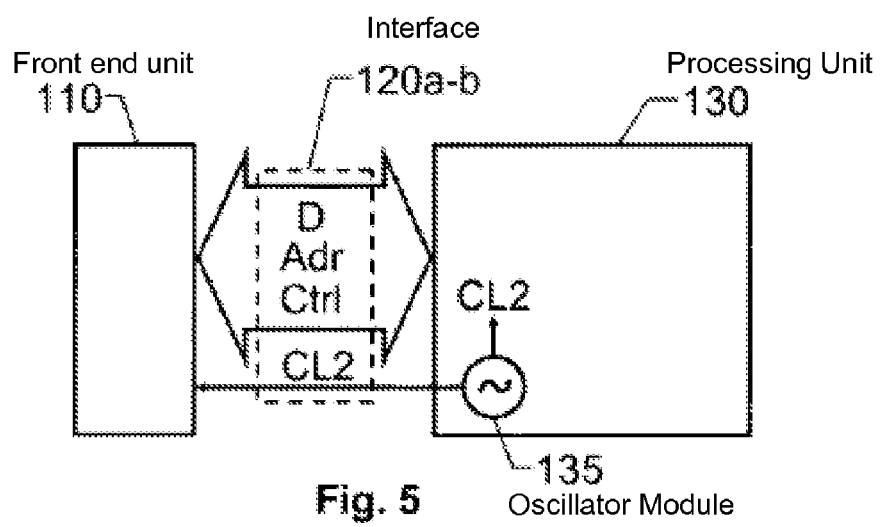

FIG. 5 shows a block diagram illustrating an alternative synchronous interface 120*a-b* between the radio front-end unit 110 and the processing unit 130 according to a preferred embodiment of the invention. The processing unit 130 is associated with a second oscillator module 135, which is adapted to produce a second clock signal CL2. The radio front-end unit 110, however, has no clock resource for the interface 120*a-b*. Thus, the interface 120*a-b* is adapted to operate according to a synchronous protocol based on the second clock signal CL2. I.e. the interface 120*a-b* includes the second clock signal CL2, such that this signal can be used by the radio front-end unit 110. In this case, it is advantageous if the interface 120*a-b* is of synchronous-memory-bus type or local-bus type.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:

1. A spread spectrum signal receiver comprising:
   a radio front-end unit having an antenna adapted to receive radio signals from a plurality of signal sources, and a digitizing circuit adapted to downconvert and filter the received radio signals and generate sample values thereof, and
   a processing unit adapted to receive the generated sample values and in response thereto produce position/time related data, the processing unit comprising software implementing at least one radio signal processing function adapted to produce the position/time related data;
   the radio front-end unit having a primary buffer unit adapted to store the sample values from the digitizing circuit, the digitizing circuit and the primary buffer unit being integrated into one and the same integrated circuit, the primary buffer unit being further adapted to allow the processing unit to read out a first set of stored sample values contemporaneously with the storing of a second set of sample values in the primary buffer unit, the integrated circuit comprising a bit-packing module adapted to alter a relative order of at least two sample values from the digitizing circuit before these sample values are stored in the primary buffer by implying that a set of samples representing a particular phase angle are stored in a specific configuration, and said relative order alteration rendering the at least two sample values adapted for processing by the software in the processing unit.

2. The receiver according to claim 1, wherein the digitizing circuit comprises at least two separate signal processing modules which each is adapted to downconvert, filter and sample incoming signals of a respective format.

3. The receiver according to claim 2, wherein each of the at least two signal processing modules is adapted to process incoming signals within a respective range of a radio spectrum.

4. The receiver according to claim 1, wherein the radio front-end unit comprises a data interface towards the processing unit, and the data interface is adapted to a data format of an input interface of the processing unit.

5. The receiver according to claim 1, wherein the data interface and the input interface are adapted to a parallel-bus format.

6. The receiver according to claim 1, wherein the data interface and the input interface are adapted to a serial-bus format.

7. The receiver according to any one of the claims 5 or 6, wherein the radio front-end unit comprises a first oscillator module adapted to deliver a first clock signal to the digitizing circuit, the processing unit comprises a second oscillator module adapted to deliver a second clock signal to the processing unit, and the interfaces are adapted to operate according to an asynchronous protocol.

8. The receiver according to any one of the claims 5 or 6, wherein the radio front-end unit comprises a first oscillator module adapted to deliver a first clock, signal to the digitizing circuit, and the interfaces are adapted to operate according to a synchronous protocol based on the first clock signal.

9. The receiver according to any one of the claims 5 or 6, wherein the processing unit comprises a second oscillator module adapted to deliver a second clock signal to the processing unit, and the interfaces are adapted to operate according to a synchronous protocol based on the second clock signal.

10. The receiver according to claim 9, wherein the processing unit comprises a secondary buffer unit adapted to store the sample values before being processed by the software.

11. The receiver according to claim 10, wherein the secondary buffer unit is adapted to allow data read-outs there from in an order different from a first-in-first-out order.

12. The receiver according to claim 11, wherein the secondary buffer unit comprises an interface towards the software adapted to provide the processing unit with a direct-memory access to sample values stored in the secondary buffer unit.

13. The receiver according to any one of the claims 11 or 12, wherein the secondary buffer unit comprises a first storage area and a second storage area which are adapted to enable write operations in respect of one area of said areas while enabling read operations in respect of the other area of said areas so as to allow a contemporaneous storing and read-out of sample values.

14. A spread spectrum signal receiver comprising: a radio front-end unit having an antenna adapted to receive radio signals from a plurality of signal sources each having a different characteristic from another, and a plurality of digitizing circuits, wherein each of the plurality of digitizing circuits is adapted to downconvert and filter a different one of the radio signals from one of the plurality of signal sources each having different characteristics and to generate sample values thereof; and
   a processing unit adapted to receive the generated sample values and in response thereto produce position/time related data for each of the received radio signals with different characteristics, the processing unit further adapted to implement at least one radio signal processing function to produce the time/position related data; and
   the radio front end unit further having a bit-packing module adapted to alter a relative order of at least two sample values from each of the digitizing circuit before these sample values are stored in the primary buffer unit by implying that a set of samples representing a particular phase angle are stored in a specific configuration, said relative order alteration rendering the at least two sample values adapted for processing by the processing unit.

* * * * *